United States Patent
Zafiroglu et al.

(10) Patent No.: US 10,212,150 B2
(45) Date of Patent: Feb. 19, 2019

(54) INTELLIGENT TASK ASSIGNMENT AND AUTHORIZATION SYSTEMS AND METHODS

(71) Applicant: Intel Corporation, Santa Clara, CA (US)

(72) Inventors: Alexandra C. Zafiroglu, Portland, OR (US); Jennifer A. Healey, San Jose, CA (US); Victoria S. Fang, Mountain View, CA (US); Tim Plowman, Berkeley, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/368,574

(22) Filed: Dec. 3, 2016

(65) Prior Publication Data
US 2017/0339131 A1    Nov. 23, 2017

Related U.S. Application Data

(63) Continuation of application No. 14/323,207, filed on Jul. 3, 2014, now Pat. No. 9,516,014.

(51) Int. Cl.
*H04L 29/06* (2006.01)
*G06F 21/62* (2013.01)
*G06Q 10/06* (2012.01)

(52) U.S. Cl.
CPC .......... *H04L 63/0823* (2013.01); *G06F 21/62* (2013.01); *G06F 21/6218* (2013.01); *G06Q 10/06* (2013.01); *G06F 2221/2111* (2013.01)

(58) Field of Classification Search
CPC . H04L 63/0823; G06F 21/62; G06F 21/6218; G06Q 10/06
See application file for complete search history.

(56) References Cited

U.S. PATENT DOCUMENTS 6,456,207 B1 * 9/2002 Yen ................. G08G 1/202
                                                         235/384
6,756,913 B1 * 6/2004 Ayed ............... G06Q 10/02
                                                         235/384

(Continued)

FOREIGN PATENT DOCUMENTS

CN        102158803 A  *  8/2011
CN        102158803 A      8/2011

(Continued)

OTHER PUBLICATIONS

Second Office Action for Chinese Application No. 201380045512.3, dated Jul. 25, 2017, 23 pages (13 pgs. translation).

(Continued)

*Primary Examiner* — Techane Gergiso
(74) *Attorney, Agent, or Firm* — Eversheds Sutherland (US) LLP

(57) ABSTRACT

The present disclosure relates to computer-implemented methods and systems for intelligent task management. An example method may include identifying one or more authorized entities. The method may further include broadcasting at least one task associated with a user to one or more devices associated with the one or more authorized entities. The method may further include receiving from the one or more authorized entities, via the one or more devices, an indication of acceptance of the at least one task. The method may further include selecting at least one trusted entity among the one or more authorized entities. The method may further include issuing at least one digital certificate to the at least one trusted entity to perform the at least one task.

20 Claims, 8 Drawing Sheets

(56) References Cited

U.S. PATENT DOCUMENTS

| | | |
|---|---|---|
| 7,530,113 B2 | 5/2009 | Braun |
| 7,945,470 B1 | 5/2011 | Cohen et al. |
| 2002/0169956 A1 | 11/2002 | Robb et al. |
| 2008/0103612 A1* | 5/2008 | Bergmann ........... H04M 1/6091 700/83 |
| 2009/0099898 A1* | 4/2009 | Ehrman ................. G06Q 10/06 705/7.15 |
| 2009/0186596 A1* | 7/2009 | Kaltsukis ............... G08B 25/08 455/404.2 |
| 2010/0117810 A1* | 5/2010 | Hagiwara ............. G06F 3/0483 340/425.5 |
| 2011/0045841 A1 | 2/2011 | Kuhlke et al. |
| 2011/0106565 A1 | 5/2011 | Compton et al. |
| 2011/0254655 A1* | 10/2011 | Maalouf ................ G06Q 30/02 340/3.1 |
| 2011/0300894 A1* | 12/2011 | Roberts, Sr. ........... G06Q 10/08 455/521 |
| 2012/0190386 A1 | 7/2012 | Anderson |
| 2013/0145165 A1 | 6/2013 | Brown et al. |
| 2014/0006076 A1 | 1/2014 | Cash, Jr. et al. |
| 2014/0043269 A1* | 2/2014 | Kuhn ..................... B60K 35/00 345/173 |
| 2014/0067491 A1* | 3/2014 | James .................... G06Q 50/30 705/13 |

FOREIGN PATENT DOCUMENTS

| | | |
|---|---|---|
| KR | 10-0701594 B1 | 3/2007 |
| KR | 2008-0027558 A | 3/2008 |

OTHER PUBLICATIONS

Office Action for Korean Patent Application No. 2015-7004681 dated Aug. 18, 2016, 12 pages (5pgs. translation).

Extended European Search Report from Application No. 13840314.2 dated May 6, 2016, 8 pages.

Office action for European Application No. 13840314.2, dated May 29, 2018, 6 pages.

* cited by examiner

INTELLIGENT TASK ASSIGNMENT AND AUTHORIZATION SYSTEMS AND METHODS

TECHNICAL FIELD

The present disclosure generally relates to task management, and in particular, to an intelligent task management and authorization system.

BACKGROUND

It is common for a person not to be able to accomplish critical tasks in a timely manner due to various circumstances out of his control. For example, unusually heavy traffic may prevent the person from picking up a child from daycare, purchasing a prescription, or buying an essential item. Currently such situations can be resolved by making telephone calls to family members or friends to see if they are available to assist in accomplishing time critical tasks. This approach is time consuming and inefficient under the circumstances.

SUMMARY OF THE DISCLOSURE

The present disclosure relates to computer-implemented methods and systems for intelligent task management. According to one or more embodiments of the disclosure, a method is provided. The method may include identifying, by a computation device including one or more processor(s), one or more authorized entities. The method may further include broadcasting, by the computation device, at least one task associated with a user to one or more devices associated with the one or more authorized entities. The method may further include receiving, by the computation device, from the one or more authorized entities, via the one or more devices, an indication of acceptance of the, at least, one task. The method may further include selecting, by the computation device, at least one trusted entity among the one or more authorized entities. The method may further include issuing, by the computation device, at least one digital certificate to the at least one trusted entity to perform the at least one task.

According to one or more embodiments of the disclosure, a system is provided. The system may include an identification module configured to identify one or more authorized entities. A wireless communication unit may be configured to broadcast at least one task associated with a user to one or more devices associated with one or more authorized entities. The wireless communication unit may be further configured to receive from the one or more authorized entities, via the one or more devices, an indication of acceptance of the at least one task. The system may further include a processor. The processor may be configured to select at least one trusted entity among the one or more authorized entities. The processor may be further configured to issue at least one digital certificate to the at least one trusted entity to perform the at least one task.

According to one or more embodiments of the disclosure, a non-transitory processor-readable medium is provided. The non-transitory processor-readable medium may have embodied thereon instructions executable by at least one processor to perform a method. The method may include identifying, by a computation device including one or more processors, one or more authorized entities. The method may further include broadcasting, by the computation device, at least one task associated with a user to one or more devices associated with the one or more authorized entities. The method may further include receiving, by the computation device, from the one or more authorized entities, via the one or more devices, an indication of acceptance of the at least one task. The method may further include selecting, by the computation device, at least one trusted entity among the one or more authorized entities. The method may further include issuing, by the computation device, at least one digital certificate to the at least one trusted entity to perform the at least one task.

Other example embodiments of the disclosure and aspects will become apparent from the following description taken in conjunction with the following drawings.

BRIEF DESCRIPTION OF THE DRAWINGS

Reference will now be made to the accompanying figures and diagrams, which are not necessarily drawn to scale, and wherein.

DETAILED DESCRIPTION

Figure 1:
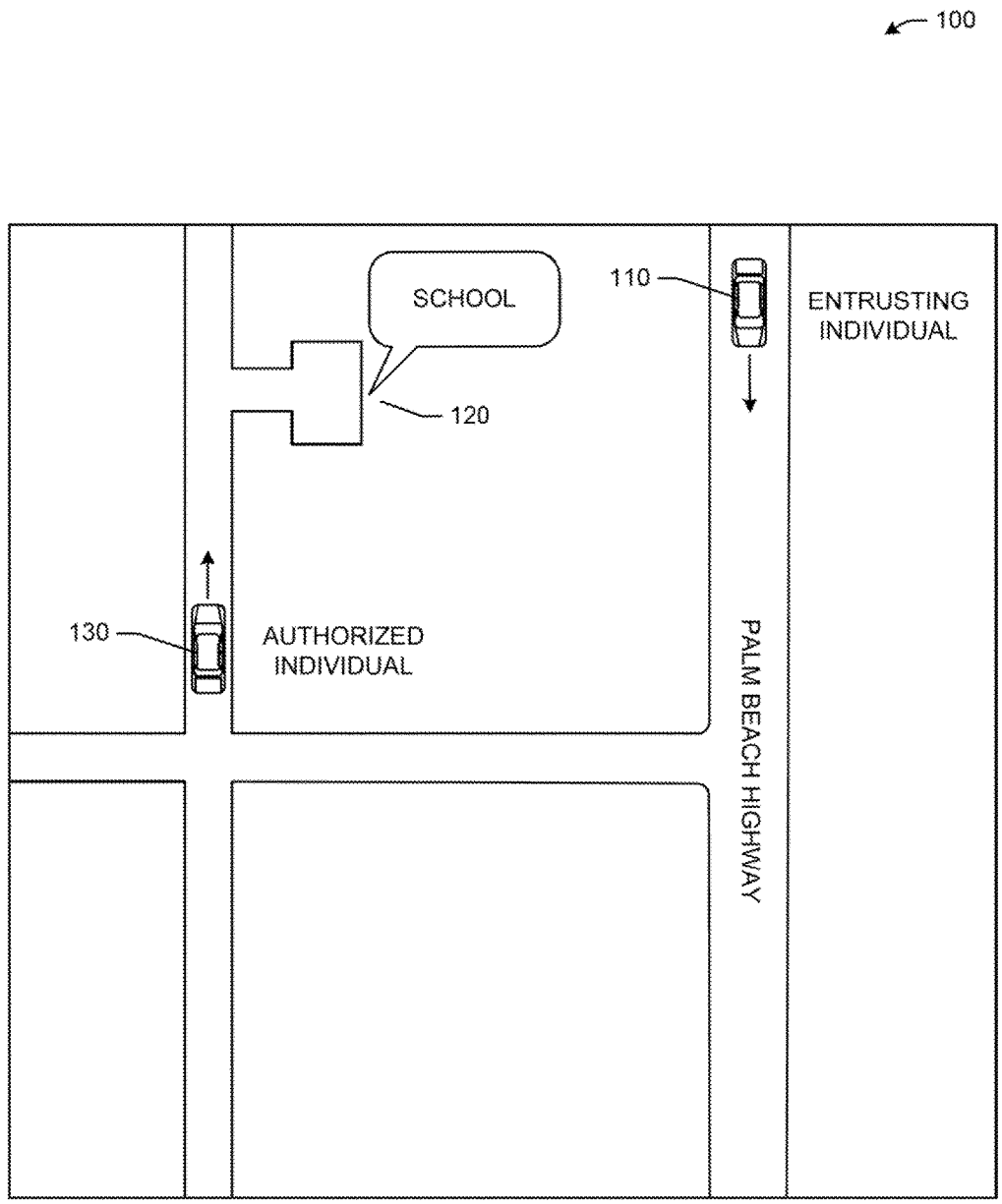
FIG. 1 shows a digital map with locations of an entrusting individual and an authorized individual, according to an example embodiment.

In the following description, numerous specific details are set forth. However, it should be understood that embodiments of the present disclosure may be practiced without these specific details. In other instances, well-known methods structures, and techniques have not been shown in detail in order not to obscure an understanding of this description. References to "one embodiment," "an embodiment," "example embodiment," "various embodiments," and so forth indicate that the embodiment(s) of the present disclosure so described may include a particular feature, structure, or characteristic, but not every embodiment necessarily includes the particular feature, structure, or characteristic. Furthermore, repeated use of the phrase "in one embodiment" does not necessarily refer to the same embodiment, although it may.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

As used herein, the term "vehicle" may refer generally to an automobile, car, truck, passenger vehicle, bus, or the like.

As used herein, unless otherwise specified, the term "mobile device" refers, in general, to a wireless communication device, and more particularly to one or more of the following: a portable electronic device, a telephone (e.g., cellular phone, smart phone), a computer (e.g., laptop computer, tablet computer), a portable media player, a personal digital assistant (PDA), or any other electronic device having a networked capability.

As used herein, unless otherwise specified, the term "in-vehicle computation system" may refer to an in-vehicle computing device, navigational system for use in a vehicle, vehicle infotainment system, or any other similar system or device.

As used herein, unless otherwise specified, the term "central server" may refer to any computing device having a networked connectivity and configured to provide one or more dedicated services to clients, such as a mobile device or in-vehicle computation system. The services may include storage of data or any kind of data processing. One example of the central server includes a web server hosting one or more web pages. Some examples of web pages may include social networking web pages.

According to one or more embodiments, the mobile device and/or the in-vehicle computation system may determine their current location by processing satellite navigation data such as Global Positioning System (GPS) data or any other suitable satellite system data. Alternatively, the location may be determined by processing multilateration data associated with the user mobile device. The multilateration location determination may be based on auxiliary data received from cellular network base stations, web servers, network routers, and so forth.

The present disclosure refers to multiple embodiments of the technology for intelligent task management. This technology may enable locating trusted individuals or trusted organizations to perform one or more time critical tasks in a time-efficient manner and authorize one or more of the trusted individuals or organizations to perform the tasks. To this end, the present technology may involve at least two parties, namely an "entrusting individual" and "authorized entities." The "entrusting individual" includes a user in need of identifying another individual or organization to perform one or more tasks. The "authorized entities" include pre-authorized individuals or pre-authorized organizations, which are willing and able to perform one or more tasks associated with the "entrusting individual", Once the entrusting individual entrusts the one or more authorized entities with the one or more task, the authorized entities may become "trusted entities."

According to one or more embodiments, the entrusting individual and authorized entities may use a mobile device and/or in-vehicle computation system to implement the methods for intelligent task management. The mobile device and/or in-vehicle computation system may enable the entrusting individuals to create user profiles, input one or more tasks, input location information associated with the one or more tasks, input information related to one or more authorized entities, make selections, entrust one or more authorized entities to perform one or more tasks, generate one or more digital certificates for the entrusted entities, and so forth. The mobile device and/or in-vehicle computation system associated with the entrusting individual may also be used to determine current location of the entrusting individual, determine (receive) location information associated with the one or more authorized entities, determine (receive) location information associated with the one or more entrusted entities, establish communications with one or more mobile devices or an in-vehicle computation system, establish communication with a central server, display location or routes associated with one or more authorized entities or entrusted entities, provide navigation, maintain a calendar, provide notifications, reminders, suggestions, and so forth.

Furthermore, the mobile device and/or in-vehicle computation system may enable the authorized entities to create user profiles, receive one or more tasks from one or more entrusting individuals, accept one or more tasks, determine a location associated with the authorized entity, determine a location associated with the one or more tasks, make selections, receive one or more digital certificates, establish communications with one or more mobile devices and in-vehicle computation system associated with the entrusting individual, establish communications with a central server, display locations or routes, provide navigation, maintain a calendar, provide notifications reminders, suggestions, and so forth.

According to one or more embodiments, tasks associated with the entrusting individual may include any actions to be performed by one or more entrusted entities within a particular geographical location. Some examples of entrusting individual tasks may include picking up a child from school, buying pet food, picking up clothes from the dry cleaners, visiting a drugstore to buy medicine, and so forth. The tasks may be associated with a particular geographical location, point of interest, building, address, and so forth. The tasks may be of an irregular nature, although some tasks may be repeated. In some embodiments, the tasks may be time-sensitive. When this is the case, the tasks may be linked to a digital calendar or otherwise associated with digital calendars. In some embodiments, the tasks may be associated with time constraints, limitations, specific list of actions to be performed, instructions, recommendations, suggestions, comments, and so forth. Moreover, the tasks may be associated with various priority level (e.g., high, medium and low), rankings, weights, and so forth. Accordingly, the tasks may be sorted in a number of different ways. In addition, the tasks can be indicated, marked or flagged as complete upon completion. In this case, the time/date of task completion may be associated with a particular task.

According to one or more embodiments, one or more tasks of the entrusting individual may be input into one or more of the following: a mobile device, an in-vehicle computation system, and a central server. More specifically, in an example embodiment, the entrusting individual associated with a mobile device, such as, for example, a smartphone may use a dedicated software application enabling the entrusting individual to enter one or more tasks. The tasks can be input using a keypad, a touchscreen, or selected from a list of predetermined tasks, or the user may input tasks by providing voice commands. Furthermore, in another example embodiment, the entrusting individual may input tasks via the in-vehicle computation system. Again, the tasks may be input via a keypad, a touchscreen or be provided as voice commands. In yet another example, the entrusting individual may use a computer or mobile device to transmit tasks to a central server such as a web server. To this end, the entrusting individual may visit a dedicated website or use an ad hoc mobile application installed onto the computer or mobile device.

According to one or more embodiments, the tasks entered via one of the devices may be transmitted to another device. This transfer may be performed automatically or after receiving special instructions from the entrusting individual. For example, once one or more tasks are entered by the entrusting individual into the mobile device, the mobile device may send the one or more tasks to the central server over a communications network. In another example, provided the mobile device contains one or more tasks previously stored by the entrusting individual, the tasks may be transmitted to the in-vehicle computation system when the mobile device comes into proximity of the in-vehicle computation system or when the in-vehicle computation system is powered with by a vehicle ignition system. Similarly, when the tasks are transmitted from the in-vehicle computation system (in other words "synchronized") to the mobile device and/or the central server, an opposite process may take place.

In yet another example, both the mobile device and the in-vehicle computation system may transmit input tasks to the central server once the entrusting individual provides the tasks. Furthermore, any time the mobile device or the in-vehicle computation system is powered or unlocked, it may be determined whether any new entrusting individual tasks are provided, and if so, such new tasks may be downloaded from the central server. In other words, the mobile device, the in-vehicle computation system, and the central server may be in communication with each other to synchronize tasks.

In operation, the entrusting individual may use his mobile device or in-vehicle computation system to input one or more tasks. For example, the task provided by the entrusting individual may include picking up a child from a school at a particular time. Thus, this task may be linked to a digital calendar and the entrusting individual may receive push notification, reminders or suggestions with respect to this task. Once the task is generated on one device (e.g., the mobile device), it may be transmitted to another one (e.g., the in-vehicle computation system and/or central server).

Furthermore, the entrusting individual may use his mobile device or in-vehicle computation system to select one or more authorized entities. In the example provided above, the authorized entities may include, for example, close friends, a baby sitter, day care staff, and the like. The authorized entities may also use mobile devices and in-vehicle computation systems to perform data communication with the entrusting individual. The authorized entities may also maintain digital profiles storing special requirements, needs, rates, operating times and dates, locations at which they can perform tasks, and so forth. The mobile devices and in-vehicle computation systems of the authorized entities may repeatedly determine their current location and, responsive to a request, provide information associated with their locations to the mobile device or in-vehicle computation system of the entrusting individual.

If the entrusting individual needs one of the authorized entities to perform one or more tasks, the entrusting individual initiates, with the help of his mobile device or in-vehicle computation system, may locate those authorized entities that can perform the one or more tasks on specified terms. Once such authorized entities are located, one or more of the authorized entities can be selectively entrusted by the entrusting individual to perform the one or more tasks. The entrustment process may involve generation by the mobile device or in-vehicle computation system of the entrusting individual, a digital certificate, which may be transmitted to the mobile device or in-vehicle computation system of the entrusted entities. The digital certificate received by the entrusted entities may provide an authorization to perform the one or more tasks. At this point, the entrusting individual may use his mobile device or in-vehicle computation system to monitor locations of the entrusted individuals, monitor the process of execution of the one or more tasks, communicate with the entrusted entities, provide recommendations, reminders, suggestions, and so forth.

The above principles are now illustrated with reference to FIG. 1, which shows a digital map 100 having locations of an entrusting individual and authorized individual. As discussed above, the entrusting individual may have, for example, a task associated with picking up a child from a school before a certain time. However, the entrusting individual may be unable to perform this task in time or at all, and thus the entrusting individual may want to assign this task to one of the authorized entities. For example, as shown in FIG. 1, the current location of the entrusting individual 110 may be too far from the location of the school 120. In an example embodiment, the mobile device or in-vehicle computation system of the entrusting individual may automatically determine his current geographical location, estimate arrival time at the target location, such as the school location 120, and suggest to the entrusting individual to entrust this task to one or more authorized entities.

With continuing reference to FIG. 1, the entrusting individual may initiate the process of searching for authorized entities. To this end, his mobile device or in-vehicle computation system may locate one or more authorized individuals within a predetermined distance from the target location 120 or within a predetermined distance from the entrusting individual 110. For example, as shown in FIG. 1, there is an authorized individual 130 located within the predetermined distance from the target location 120. Once such authorized individual 130 is located, the mobile device or in-vehicle computation system of the entrusting individual 110 may broadcast one or more tasks (e.g., the task of picking up a child from the school) to the mobile devices and/or in-vehicle computation systems of the authorized individuals. Accordingly, once the one or more tasks are broadcasted, the mobile device or in-vehicle computation system associated with the authorized individual 130 may generate a push notification such as a displayable message and/or audio message to prompt the authorized individual 130 to accept or decline the one or more tasks.

Furthermore, in case the authorized individual 130 accepts the one or more tasks of the entrusting individual, the mobile device or in-vehicle computation system of the authorized individual 130 may generate a message indicating acceptance of the task, which may be then transmitted to the mobile device or in-vehicle computation system of the entrusting individual 110. The message may indicate that the authorized individual 130 is ready and willing to perform the one or more tasks. Further, the message of acceptance may include various information including a current location of the authorized individual 130, specific restrictions, authorized individual rates, authorized individual bid, and so forth.

Furthermore, the entrusting individual 110 may receive a message of acceptance of the task from one or more authorized individuals 130. In case of two or more messages of acceptance of the task received from two or more authorized individuals 130, the entrusting individual 110 may select one of those authorized individuals 130, to perform the one or more tasks. In either case, the entrusting individual 110 may entrust the authorized individual 130 with performing the task of picking up the child from the school. To this end, the mobile device or in-vehicle computation system of the entrusting individual 110 may generate one or more digital certificates and broadcast the one or more digital certificates to the selected authorized individual 130. Upon receipt of the one or more digital certificates by the mobile device or in-vehicle computation system of the authorized individual 130, the authorized individual 130 may start performing the one or more tasks. In this case, the authorized individual 130 who received the one or more digital certificates is considered a "trusted entity" or a "trusted individual". Accordingly, the trusted individual 130 may now pick up the child from the school 120 per instructions provided with the task.

While performing the one or more tasks, the entrusting individual 110 may monitor the current location of the trusted individual 130, performance of the tasks, provide the trusted individual 130 with instructions, recommendations, suggestions, notifications, and so forth. When the one or more tasks are completed by the trusted individual 130, the trusted individual 130 may indicate a particular task as complete via his mobile device or in-vehicle computation system. The completion information can be transmitted to the mobile device or in-vehicle computation system of the entrusting individual 110. Alternatively, the entrusting individual 110 may mark one or more tasks as complete via his mobile device or in-vehicle computation system.

According to one or more embodiments, the selection of authorized individuals 130 who accepted the task of the entrusting individual 110, may be performed not only by the entrusting individual 110, but also by the mobile device or in-vehicle computation system of the entrusting individual 110. Specifically, there can be one or more rules, policies, settings (which may optionally be tied to a profile of the entrusting individual 110), which may be followed to select one or more authorized individuals 130. In yet another embodiment, as selection of authorized individuals 130 is performed, the mobile device or in-vehicle computation system of the entrusting individual 110 may analyze historical data associated with a particular authorized individual 130. For example, if it is determined that for a particular task a particular authorized individual 130 was selected over several times in the past, the mobile device or in-vehicle computation system of the entrusting individual 110 may automatically make a selection decision with respect to this authorized individual 130.

Furthermore, according to one or more embodiments of the present disclosure, when the mobile device or in-vehicle computation system of the entrusting individual 110 is conducting a search for authorized individuals 130 to find those that are located in proximity of a target location (i.e., a location associated with one or more tasks), there may a number of associated conditions. In an example, the search for authorized individuals 130 may depend on a type of a task. The entrusting individual 110 may pre-select several groups of authorized individuals 130, wherein each group may perform certain tasks only. In another example, the search for authorized individuals 130 may depend on a task priority. Again, the entrusting individual 110 may pre-select some authorized individuals 130 for tasks associated with a higher priority (higher ranking, higher weight) and some other authorized individuals 130 for tasks of lower priority (lower ranking, lower weight).

As discussed above, the entrusting individual 110 and one or more authorized individuals 130 may have virtual profiles. The profiles may be stored, for example, within the central server so that any of the mobile devices and the in-vehicle computation systems may access the profiles over a communications network such as a cellular network or the Internet. In general, the profiles may include user personal information including a user name, a user photo, one or more user tasks, information associated with completed tasks, typical travel routes, passwords, credential information, addresses (such as home address, work address, points of interest addresses), biometric information, and so forth. The profiles may be further used for user recognition and user authentication. In addition, the profiles may be associated with profiles of the entrusting individual 110 and authorized individuals 130 on one or more social networking sites, blogging sites, or alike.

According to one or more embodiments, when the authorized individuals 130 indicate their ability and willingness to perform one or more tasks, i.e. when messages of acceptance of particular tasks are generated, the authorized individuals 130 may be optionally prompted to confirm that they agree with conditions associated with particular tasks. The conditions may be set by the entrusting individual 110 and may include a compensation value (e.g., hour rate, flat rate), time/date by which the task shall be conducted, reporting requirements, and so forth.

According to one or more embodiments of the present disclosure, before the tasks are assigned to particular authorized individuals 130, such authorized individuals 130 may need to be recognized by the mobile device or in-vehicle computation system. Similarly, the entrusting individual 110 may need to be recognized by the mobile device or in-vehicle computation system before any tasks are broadcasted to authorized individuals 130. In this regard, the in-vehicle computation system or the mobile device may include user recognition hardware and/or software components. In an example, there can be at least one video camera commutatively coupled to the in-vehicle computation system so that the in-vehicle computation system is able to perform face recognition to determine (and optionally authenticate, validate) one or more individuals. Alternatively, the in-vehicle computation system may recognize a particular individual by processing individual voice or speech. In yet another example, the in-vehicle computation system may recognize a particular individual by communicating with his mobile device. In yet another example, the in-vehicle computation system may prompt the individuals to input a password, credentials, personal identification number (PIN) or some other identifying information via a keypad or touchscreen. Those skilled in the art will appreciate that any suitable recognition technology can be used including biometrics-based technologies. The biometrics-based technologies may include recognition/authenticating algorithms based on processing of images (e.g., face images, retina, iris, fingerprints), processing audio (e.g., voice, speech), biosigns (e.g., electrical resistance of skin areas, electrical or electromagnetic parameters of user body), behavioral parameters (e.g., keystroke dynamics, gestures), and so forth.

As discussed above, the tasks may be flagged, indicated, or otherwise marked as complete. This information may be stored in any of the following: the mobile device, the in-vehicle computation system and/or the central server. The tasks may be indicated as complete by the entrusting individual 110 and/or trusted individuals 130 by providing a corresponding input or providing a voice command. In another example, one of the mobile devices, the in-vehicle computation system or the central server may automatically determine that a trusted individual 130 visited a location associated with a particular task, and thus one of these devices can automatically assume that the task is complete. In this case, the mobile device and/or the in-vehicle computation system may prompt the trusted individual 130 to confirm that a particular task is complete. It should be also mentioned that information indicating completeness of tasks can be transmitted from one device to another, i.e. from the mobile device to the in-vehicle computation system and/or the central server, and vice versa.

According to one or more embodiments of the present disclosure, once one or more tasks are accepted and the digital certificates are sent to trusted individuals who will perform the tasks, the trusted individuals may be guided or navigated to one or more locations associated with the one or more tasks. For this purpose, the mobile device or in-vehicle computation system may generate one or more routes to the locations, prompt the user to select one of the routes, provide driving directions to the locations, display digital map, and adjust the routes based on historical travel information and/or current traffic information.

Figure 2:
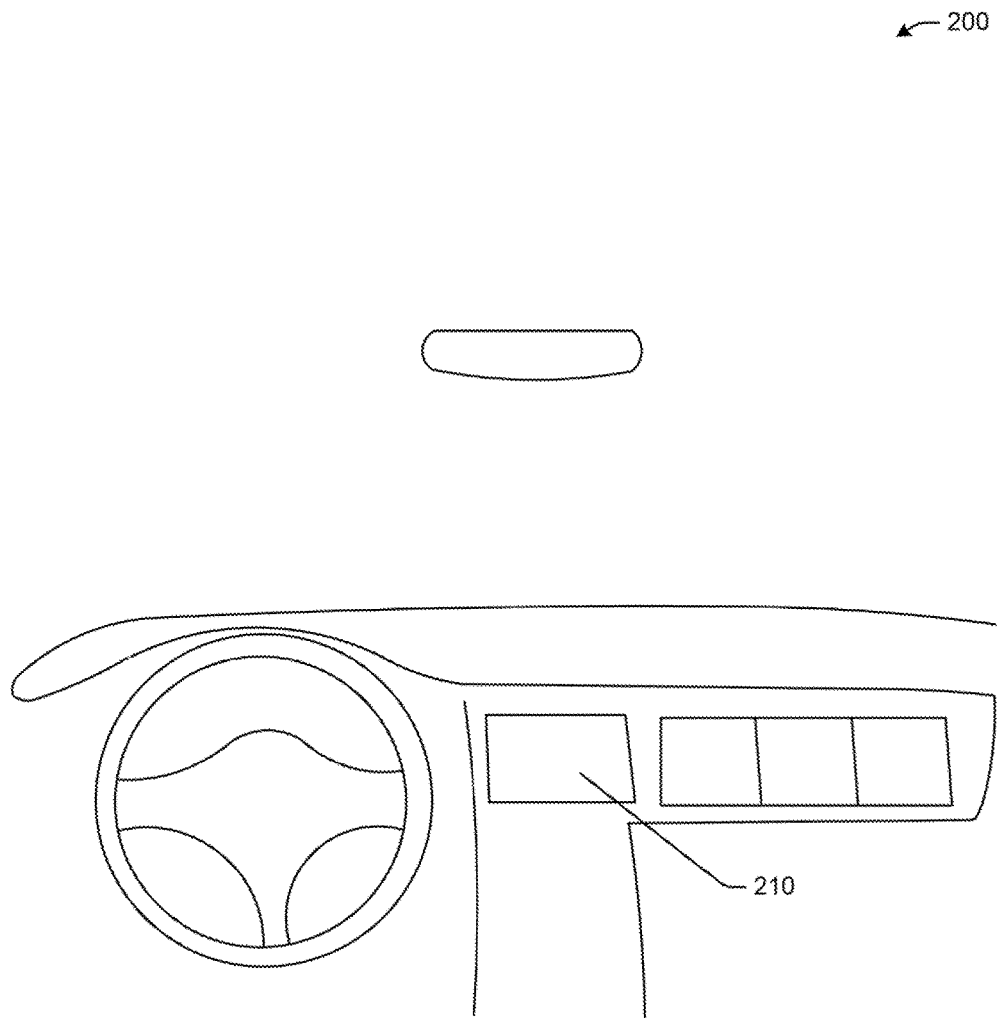
FIG. 2 shows a dashboard of a vehicle having an in-vehicle computation system, according to an example embodiment.

FIG. 2 shows an example dashboard 200 of a vehicle having an in-vehicle computation system 210. In this figure, the in-vehicle computation system 210 is schematically shown as a display located within the vehicle dashboard 200 such that one or more individuals (e.g., the entrusting individual 110, authorized individuals 130 or trusted individuals) may see the display. The display may show digital maps, routes, travel suggestions, notifications, reminders, tasks, and so forth. Furthermore, the display may include a keypad or a touchscreen enabling the users to make inputs including tasks, selections of tasks, acceptance of conditions, selection of completed tasks, and so forth. Other components of the in-vehicle computation system 210 will be provided below with reference to FIG. 7.

Figure 3:
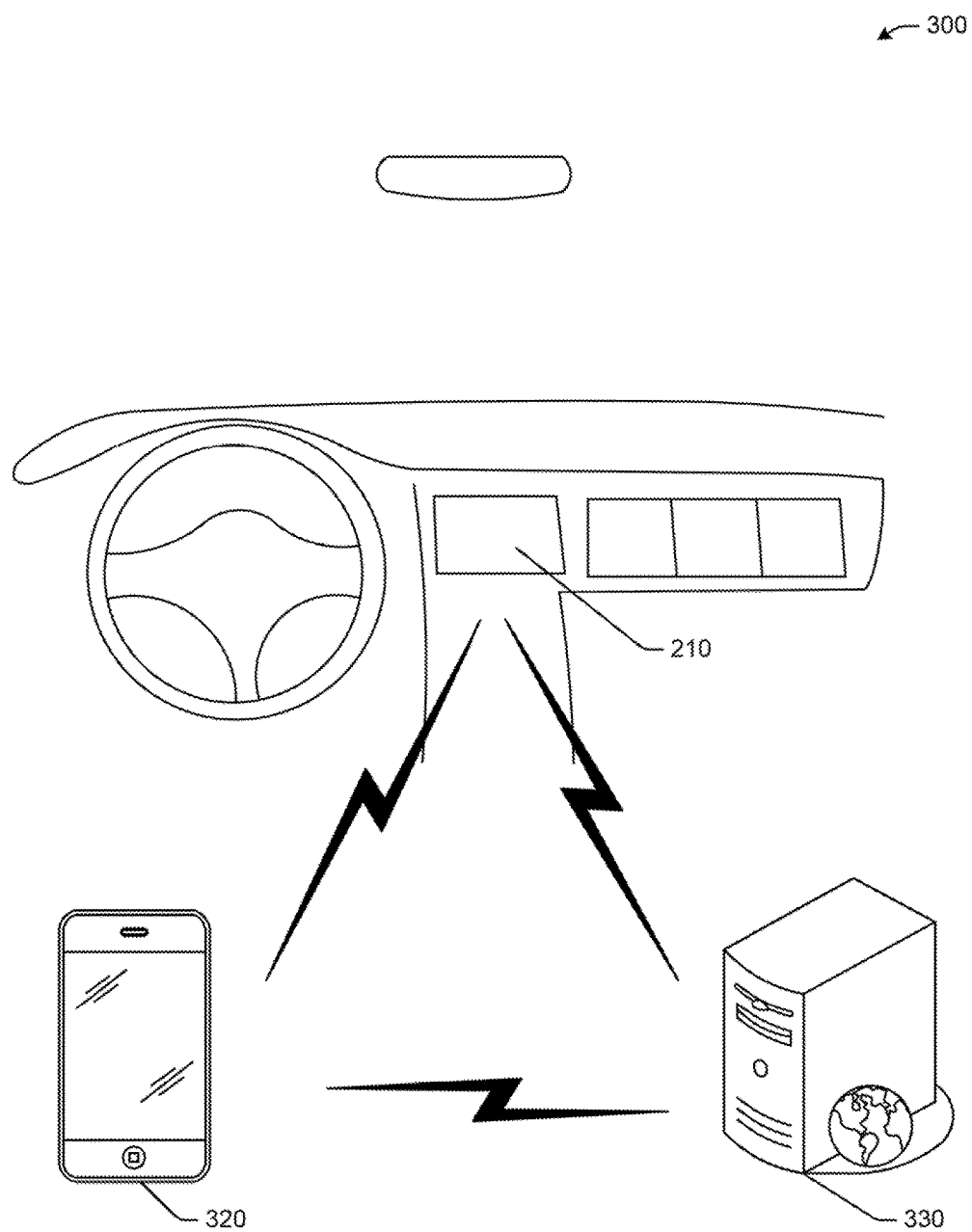
FIG. 3 shows a dashboard of a vehicle having an in-vehicle computation system in communication with a mobile device and a central server, according to an example embodiment.

FIG. 3 shows an example dashboard 300 of a vehicle having an in-vehicle computation system 210 in communication with a mobile device 320 and/or a central server 330. According to one or more embodiments of the present disclosure, the in-vehicle computation system 210 may establish wireless communication with the mobile device 320 to transmit notifications, tasks, routes, reminders, settings, messages, and so forth. Similarly, the in-vehicle computation system 210 may establish wireless communication with the central server 330 to transmit notifications, tasks, routes, reminders, messages, profile data, and other data. The wireless communication may include communication using IEEE 802.11 group of standards, Bluetooth communication standards, infrared (IR) communication standards, or any other radio or electro-magnetic wireless communication standard. The entrusting individuals 110 may use their mobile device 320 to input tasks and locations associated therewith. Once the entrusting individual 110 enters the vehicle, the mobile device 320 may automatically transmit the tasks to the in vehicle computation system 210. To this end, the tasks can be displayed on a display screen of the mobile device and a display screen of the in-vehicle computation system 210. Furthermore, the mobile device 320 may generate notifications and transmit the notifications to the in-vehicle computation system 210 such that the notifications can be played using vehicle speakers and/or the display of the in-vehicle computation system 210. In addition, when the entrusting individual 110 or trusted individuals 130 indicate that a particular task is complete via the in-vehicle computation system 210, the information may be transmitted to the mobile device 320 and/or the central server 330. Similarly, if entrusting individuals 110 input tasks or other information into the central server 330, the tasks can be automatically sent to the mobile device 320 and/or in-vehicle computation system 210. To this end, records associated with these devices and systems may be synchronized in real time so there is no confusion for the entrusting individuals 110. Those skilled in the art will understand, that the tasks, if input into the in-vehicle computation system 210, may be transmitted to the mobile device 320 and/or the central server 330, or vice versa. This approach may enable playing the notifications, reminders, and suggestions via the mobile device 320.

Figure 4:
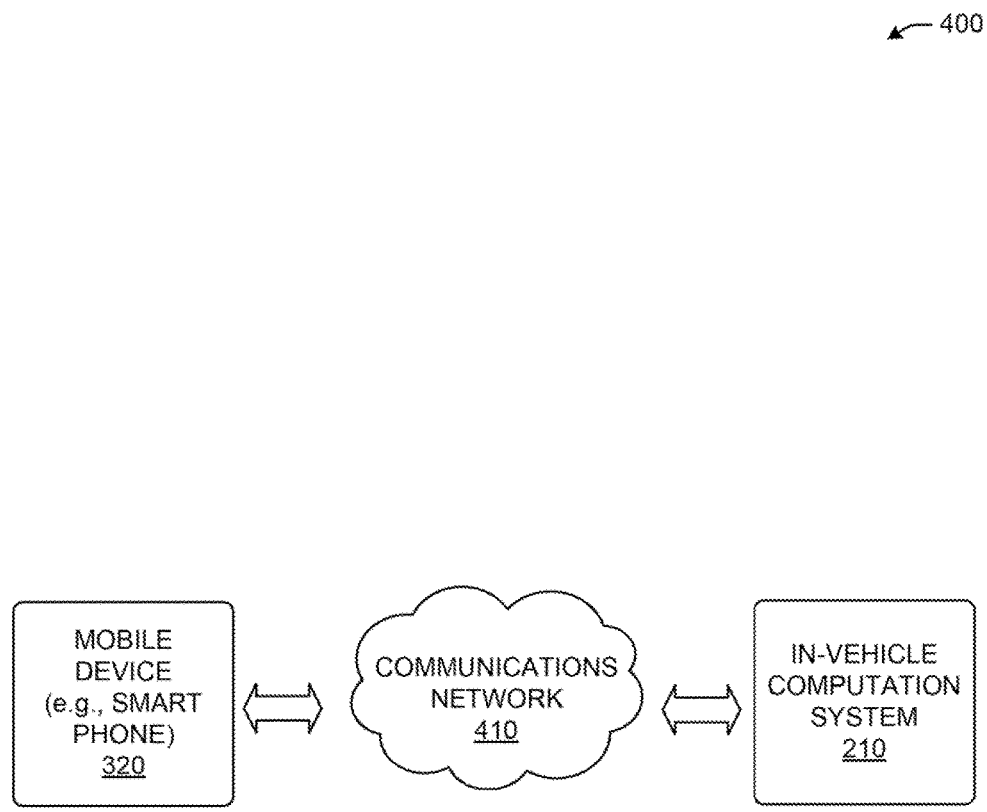
FIG. 4 shows an example environment suitable for implementing methods for intelligent task management.

FIG. 4 shows an example environment 400 suitable for implementing methods for intelligent task management. The environment 400 includes an in-vehicle computation system 210, a mobile device 320 and/or a communications network 410. Those skilled in the art will appreciate that the in-vehicle computation system 210 and the mobile device 320 may communicate with each other via the one or more communications networks 410.

Figure 5:
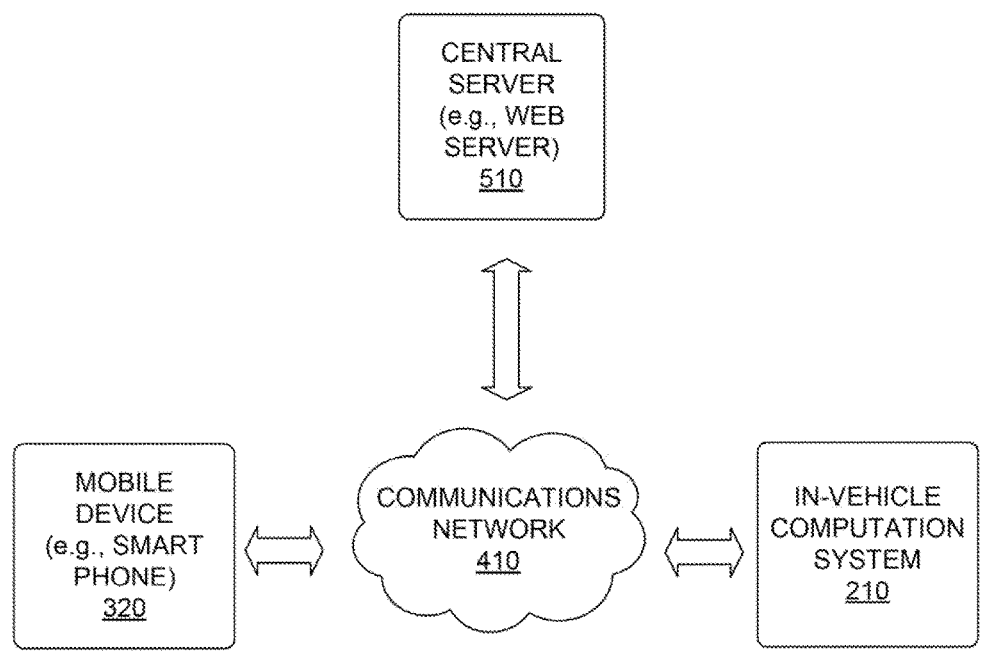
FIG. 5 shows an example environment suitable for implementing methods for intelligent task management.

FIG. 5 shows another example environment 500 suitable for implementing methods for intelligent task management. The environment 500 includes an in-vehicle computation system 210, a mobile device 320 and/or a central server 510. These components are in communication with each other via a communications network 410.

In FIGS. 4 and 5, the communications network 410 may include a network of data processing nodes interconnected for the purpose of data communication, which may be utilized to communicatively couple various components of the environments 400 and 500. The network 410 may include the Internet or any other network capable of communicating data between devices. Suitable networks may include or interface with any one or more of, for instance, a local intranet, a PAN (Personal Area Network), a LAN (Local Area Network), a WAN (Wide Area Network), a MAN (Metropolitan Area Network), a virtual private network (VPN), a storage area network (SAN), a frame relay connection, an Advanced Intelligent Network (AIN) connection, a synchronous optical network (SONET) connection, a digital T1, T3, E1 or E3 line, Digital Data Service (DDS) connection, DSL (Digital Subscriber Line) connection, an Ethernet connection, an ISDN (Integrated Services Digital Network) line, a dial-up port, such as a V.90, V.34 or V.34bis analog modem connection, a cable modem, an ATM (Asynchronous Transfer Mode) connection, or a FDDI (Fiber Distributed Data Interface) or CDDI (Copper Distributed Data Interface) connection. Furthermore, communications may also include links to any of a variety of wireless networks, including WAP (Wireless Application Protocol), GPRS (General Packet Radio Service), GSM (Global System for Mobile Communication), CDMA (Code Division Multiple Access) or TDMA (Time Division Multiple Access), cellular phone networks, GPS (Global Positioning System), CDPD (cellular digital packet data), RIM (Research in Motion, Limited) duplex paging network, Bluetooth radio, or an IEEE 802.11-based radio frequency network. The network 410 may further include or interface with any one or more of an RS-232 serial connection, an IEEE-1394 (Firewire) connection, a Fiber Channel connection, an IrDA (infrared) port, a SCSI (Small Computer Systems Interface) connection, a USB (Universal Serial Bus) connection or other wired or wireless, digital or analog interface or connection, mesh or Digi® networking.

It should also be mentioned that for practicing the principles of the present disclosure, presence of all mentioned elements is not required. In some embodiments, the methods for intelligent task management may be practiced using only the mobile device 320 or only in-vehicle computation system 210. In some other embodiments, the methods for intelligent task management can be practiced using just two of the above described elements. For example, only the mobile device 320 and the in-vehicle computation system 210 can be used. Alternatively, only the mobile device 320 and the central server 510 can be used. Alternatively, only the in-vehicle computation system 210 and the central server 510 can be used. In yet other embodiments, all components, namely the in-vehicle computation system 210, the mobile device 320 and the central server 510 may be used to practice the technology described herein.

Figure 6:
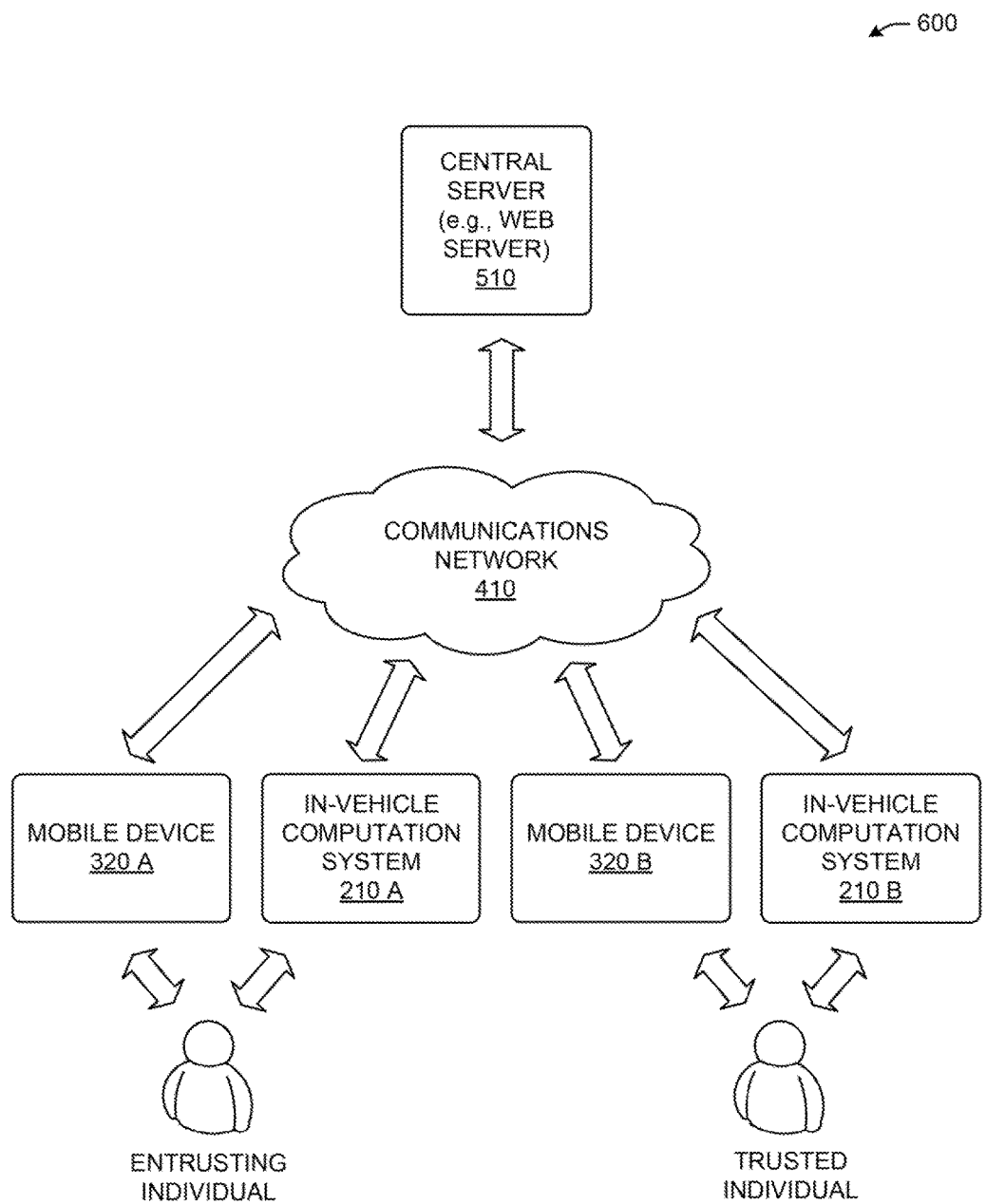
FIG. 6 shows an example environment suitable for implementing methods for intelligent task management, wherein an entrusting individual and a trusted individual may communicate with each other.

FIG. 6 shows an example environment 600 suitable for implementing methods for intelligent task management, which illustrates how an entrusting individual and a trusted individual may communicate with each other. Specifically, it is shown that both entrusting individual and the trusted individual may be associated with respective in-vehicle computation system 210A and 210B and/or mobile devices 320A and 320B. As discussed above, the communications between the components of environment 600 may be implemented over the communications network 410.

Figure 7:
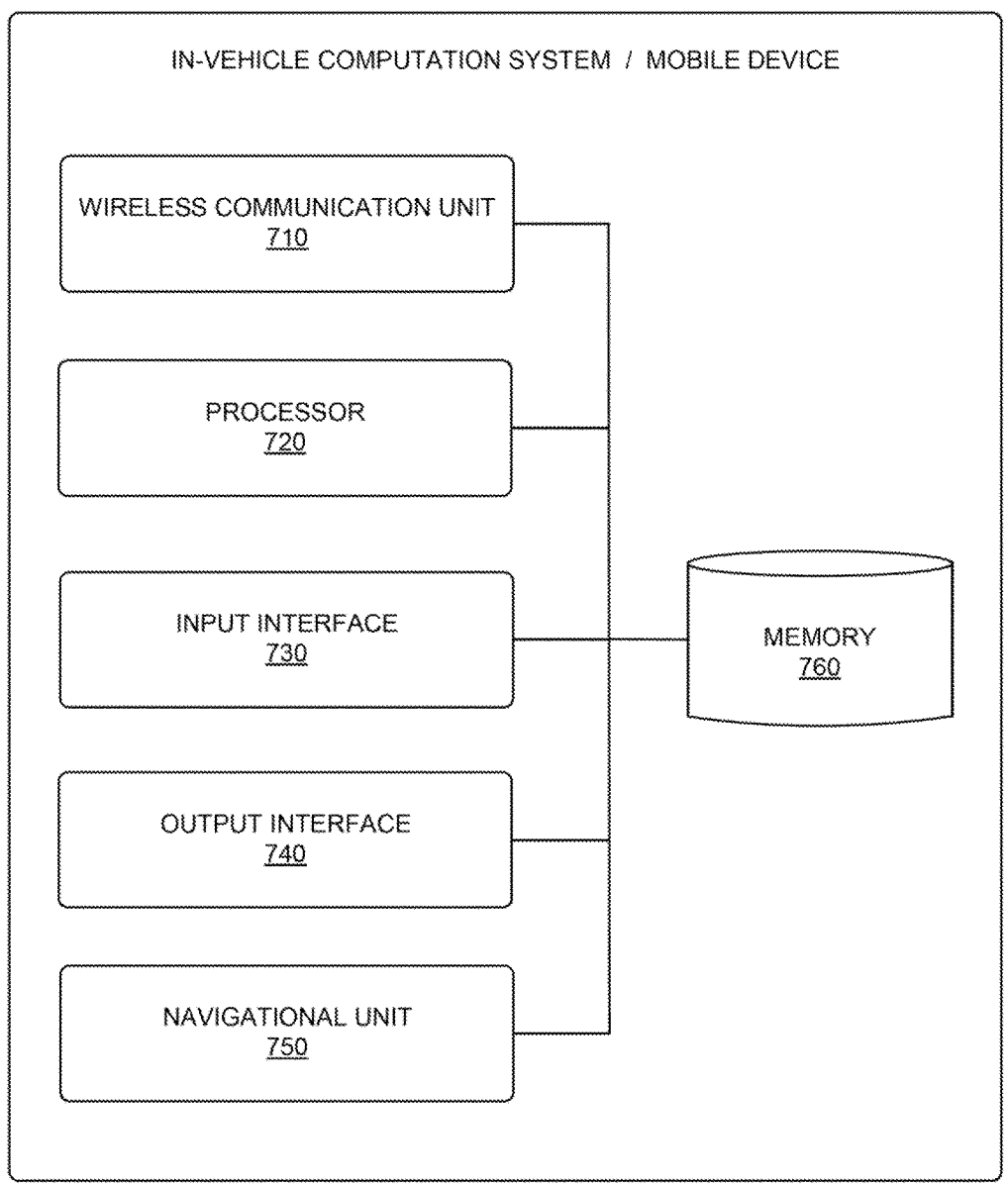
FIG. 7 shows an example embodiment of an in-vehicle computation system or a mobile device.

FIG. 7 shows an example embodiment of a system 700 that may include an in-vehicle computation system or a mobile device. As shown in the figure, the system 700 may comprise a wireless communication unit 710, one or more processors 720, an input interface 730, an output interface 740, a navigational unit 750, and a memory 760.

The wireless communication unit 710 may be configured to receive data from a communications network 410 and transmit data to the communications network 410. In some embodiments, the wireless communication unit 710 may establish communications between the elements 720-760.

The one or more processors 720 may be configured to perform one or more logic operations related to various methods for intelligent task management as described herein. For example, the one or more processors 720 may be configured to generate one or more notifications (reminders, suggestions) with respect to at least one user task, generate one or more digital certificates associated with one or more tasks, enable individuals to mark tasks as complete, generate one or more routes to locations associated with one or more tasks, notify the individuals of the completion of one or more tasks, process location information and also traffic information to generate or adjust one or more routes, overlay routes over one or more digital maps, rank tasks, set priorities to tasks, perform recognition of individuals, voice recognition, and so forth. According to some embodiments, the one or more processors 720 may include an identification module implemented as hardware and/or software element, which may be configured to identify authorized entities 130. The authorized entities 130 may be identified, for example, by aggregating location information associated from authorized entities 130 or the central server 510. According to some embodiments, this identification module can be a stand-alone device of system 700.

The input interface 730 may be configured to enable one or more individuals to make various inputs. The inputs may include tasks, selections, routes, addresses, locations, user profiles, policies, task rankings, settings, constraints, and so forth. The input interface 730 may include one or more of a keypad, a touchscreen, a touchpad, a trackball, a microphone, voice recognition hardware/software, and so forth.

The output interface 740 may be configured to present to one or more individuals text messages, video messages, images, multimedia messages, audio messages, voice messages, mechanical signals, and so forth. The output interface 740 may include a display such as a light-emitting diode (LED) display, organic light-emitting diode (OLED) display, liquid crystal display (LCD), an electro-phoretic display, and so forth. The output interface 740 may also include speakers and a vibration machine to generate vibrations.

The navigational unit 750 may be configured to determine a current location of the system 700. The current location can be determined by receiving and processing signals of the GPS or any other satellite system. Alternatively, the location may be determined by processing multilateration data associated with system 700. The multilateration location determination may be based on auxiliary data received from cellular network base stations, web servers, network routers, and so forth. The navigational unit 750 may also provide navigation for the users by generating routes, paths, travel tips, overlaying routes over digital maps, process traffic information, and so forth.

The memory 760 may be configured to store data needed for operation of the system 700, which data may include tasks, selections, digital certificates, notifications, reminders, suggestions, routes, calendar data, traffic data, digital maps, virtual profiles, settings, policies, and so forth.

Figure 8:
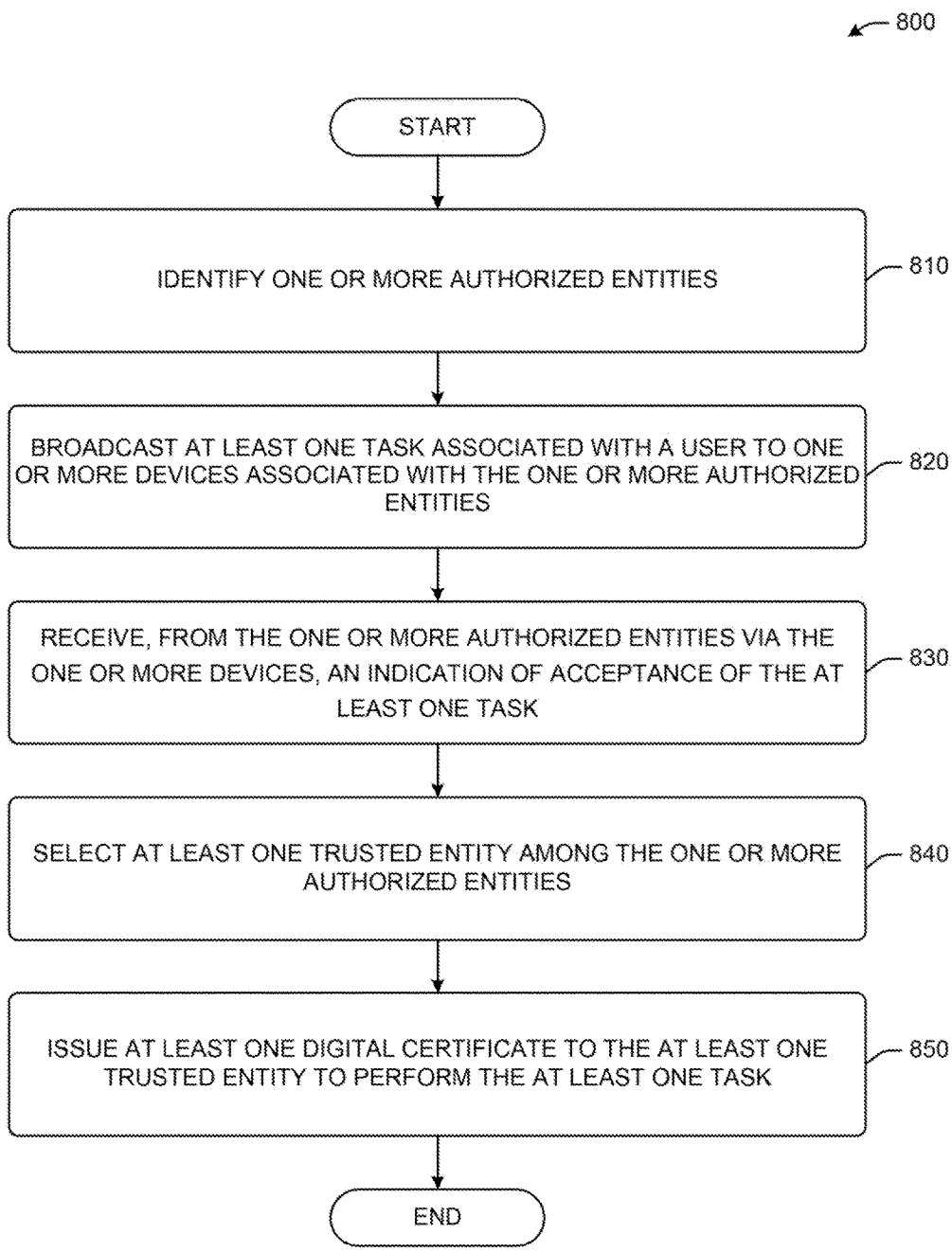
FIG. 8 is a process flow diagram illustrating a method for intelligent task management, according to an example embodiment.

FIG. 8 shows a process flow diagram showing a method 800 for intelligent task management, according to an example embodiment. The method 800 may be performed by processing logic that may comprise hardware (e.g., dedicated logic, programmable logic, and microcode), software (such as software run on a general-purpose computer system or a dedicated machine), or a combination of both. In one example embodiment, the processing logic resides at the system 700.

As shown in FIG. 8, the method 800 may commence at operation 810 with the one or more processors 720 and/or identification module identifying one or more authorized entities. The one or more authorized entities may be identified by aggregating location information associated with the one or more authorized entities and other messages broadcasted over the communications network 410.

At operation 820, the wireless communication unit 710 broadcasts at least one task associated with an entrusting individual 110 to one or more devices associated with the one or more authorized entities 130. The one or more devices associated with the one or more authorized entities 130 may include mobile devices 320 and/or in-vehicle computation systems 210.

At operation 830, the wireless communication unit 710 receives from the one or more authorized entities 130 via the one or more devices 320, an indication of acceptance of the at least one task. The indication of acceptance of the at least one task may be implemented as a broadcasted message including location information of the authorized entities 130, indication of their consent with terms, rules, policies associated with the one or more tasks, and so forth.

At operation 840, the one or more processors 720 selects at least one authorized entity 130 among the one or more authorized entities 130. Once an authorized entity 130 is selected, it may be considered a trusted entity 110. The selection may be performed by the entrusting individual 110 or automatically by the one or more processors 720.

At operation 850, the one or more processors 720 may issue at least one digital certificate to the at least one trusted entity 110 to perform the at least one task. The digital certificate may be broadcasted to the at least one trusted entity 110 via the communications network 410.

Certain embodiments of the present disclosure are described above with reference to block and flow diagrams of systems and methods and/or computer program products according to example embodiments of the present disclosure. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some embodiments of the present disclosure.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, embodiments of the present disclosure may provide for a computer program product, comprising a computer-usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

While certain embodiments of the present disclosure have been described in connection with what is presently considered to be the most practical and various embodiments, it is to be understood that the present disclosure is not to be limited to the disclosed embodiments, on the contrary, is intended to cover various modifications and equivalent arrangements included within the scope of the appended claims. Although specific terms are employed herein, they are used in a generic and descriptive sense only and not for purposes of limitation.

Certain embodiments of the present disclosure described herein may have the technical effect of enhancing task management by addressing "just in time" errand coordination within a pre-authenticated "circle of trust". In other words, the technical effect may lie in simplifying and speeding up the process of assigning tasks by one individual to another individual or organization. Further, certain embodiments of the present disclosure described herein may have the technical effect of enhancing flexibility and usability of how the individuals can broadcast and assign tasks to authorized individuals or organizations from a vehicle.

This written description uses examples to disclose certain embodiments of the present disclosure, including the best mode, and also to enable any person skilled in the art to practice certain embodiments of the present disclosure, including making and using any devices or systems and performing any incorporated methods. The patentable scope of certain embodiments of the present disclosure is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A mobile device, the mobile device comprising processing circuitry coupled to storage, the processing circuitry configured to:
   determine a status of the mobile device in association with an in-vehicle computation system;
   establish a connection with an in-vehicle computation system based on the status;
   receive a request to perform a task from a first device associated with an entrusting entity;
   cause to send a feedback message to the first device, wherein the feedback message indicates a capability to perform the task based on a criteria;
   identify a digital certificate received from the first device associated with the entrusting entity indicating an authorization to perform the task;
   transfer the task to the in-vehicle computation system based on the status; and
   synchronize data associated with the task with the in-vehicle computation system.

2. The mobile device of claim 1, wherein the status of the mobile device comprises an indication that the device is in proximity of the in-vehicle computation system.

3. The mobile device of claim 1, wherein the status of the mobile device comprises an indication of powering up or unlocking the mobile device.

4. The mobile device of claim 1, wherein the criteria is associated with a predetermined distance from a location associated with the task or a predetermined distance from a location associated with the entrusting entity.

5. The mobile device of claim 1, wherein the data is synchronized in real-time.

6. The mobile device of claim 1, wherein the task is to be performed after receipt of the digital certificate.

7. The mobile device of claim 1, wherein the processing circuitry is further configured to notify the first device a completion status of the task.

8. A non-transitory computer-readable medium storing computer-executable instructions which when executed by one or more processors of a mobile device result in performing operations comprising:
   determining a status of the mobile device in association with an in-vehicle computation system;
   establishing a connection with an in-vehicle computation system based on the status;
   receiving a request to perform a task from a first device associated with an entrusting entity;
   causing to send a feedback message to the first device, wherein the feedback message indicates a capability to perform the task based on a criteria;
   identifying a digital certificate received from the first device associated with the entrusting entity indicating an authorization to perform the task;

transferring the task to the in-vehicle computation system based on the status; and synchronizing data associated with the task with the in-vehicle computation system.

9. The non-transitory computer-readable medium of claim 8, wherein the status of the mobile device comprises an indication that the device is in proximity of the in-vehicle computation system.

10. The non-transitory computer-readable medium of claim 8, wherein the status of the mobile device comprises an indication of powering up or unlocking the mobile device.

11. The non-transitory computer-readable medium of claim 8, wherein the criteria is associated with a predetermined distance from a location associated with the task or a predetermined distance from a location associated with the entrusting entity.

12. The non-transitory computer-readable medium of claim 8, wherein the data is synchronized in real-time.

13. The non-transitory computer-readable medium of claim 8, wherein the task is to be performed after receipt of the digital certificate.

14. The non-transitory computer-readable medium of claim 8, wherein the operations further comprise notifying the first device a completion status of the task.

15. A method comprising:

determining, by one or more processors, a status of a mobile device in association with an in-vehicle computation system;

establishing a connection with an in-vehicle computation system based on the status;

receiving a request to perform a task from a first device associated with an entrusting entity;

causing to send a feedback message to the first device, wherein the feedback message indicates a capability to perform the task based on a criteria;

identifying a digital certificate received from the first device associated with the entrusting entity indicating an authorization to perform the task;

transferring the task to the in-vehicle computation system based on the status; and synchronizing data associated with the task with the in-vehicle computation system.

16. The method of claim 15, wherein the status of the mobile device comprises an indication that the device is in proximity of the in-vehicle computation system.

17. The method of claim 15, wherein the status of the mobile comprises an indication of powering up or unlocking the mobile device.

18. The method of claim 15, wherein the criteria is associated with a predetermined distance from a location associated with the task or a predetermined distance from a location associated with the entrusting entity.

19. The method of claim 15, wherein the task is to be performed after receipt of the digital certificate.

20. The method of claim 15, further comprising notifying the first device a completion status of the task.

* * * * *